March 21, 1933.   F. V. CALVERT   1,902,487
OIL FILLED HIGH TENSION CABLE
Filed July 26, 1928

Inventor:
Francis V. Calvert,
by Charles V. Tullar
His Attorney.

Patented Mar. 21, 1933

1,902,487

UNITED STATES PATENT OFFICE

FRANCIS V. CALVERT, OF MADISON, MAINE, ASSIGNOR TO GENERAL ELECTRIC COMPANY, A CORPORATION OF NEW YORK

OIL-FILLED HIGH TENSION CABLE

Application filed July 26, 1928. Serial No. 295,569.

My invention relates to high tension cables particularly for use underground, which cables comprise one or more suitably-insulated conductors, a lead or equivalent sheath and one or more passages or channels within the sheath in which thin oil is retained which oil serves to maintain the insulation on the conductors in a saturated or impregnated condition and also prevents the formation of voids which are so highly objectionable by completely filling all the spaces within the sheath.

In order to prevent injury to the cable especially to the sheath when the oil heats and expands and to prevent the formation of voids in the insulation, it is the customary practice to employ separate reservoirs located at suitably-spaced positions along the length of the cable which are connected to the oil space or channel within the cable sheath and into which oil from the cable flows as its temperature increases and from which it flows as the temperature falls. These reservoirs are relatively expensive pieces of apparatus and of fairly sizable dimensions and hence provision has to be made for them either in towers located above the ground or in manholes. In both instances they occupy valuable space and represent a substantial increase in cost of installation.

My invention has for its object to provide a cable of improved construction having an element or means located wholly within the cable itself which will automatically compensate for the expansion and contraction of the oil within the cable due to temperature changes and thus prevent formation of voids and injury to the sheath.

For a consideration of what I believe to be novel and my invention, attention is directed to the accompanying description and the claims appended thereto.

Figure 1:
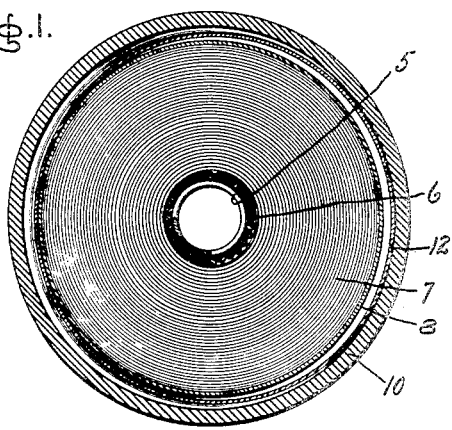
Figure 3:
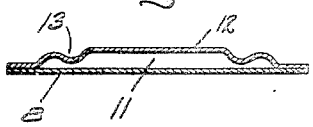
Figure 2:
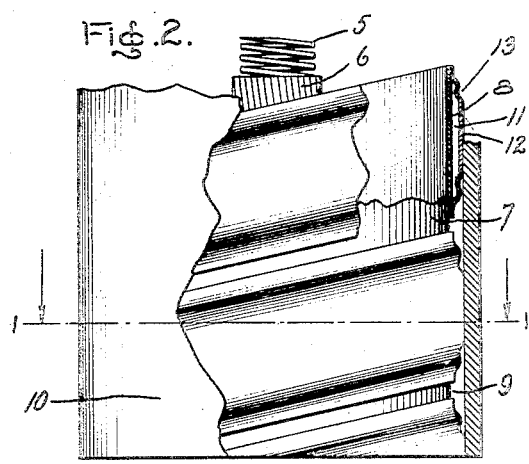
Figure 4:
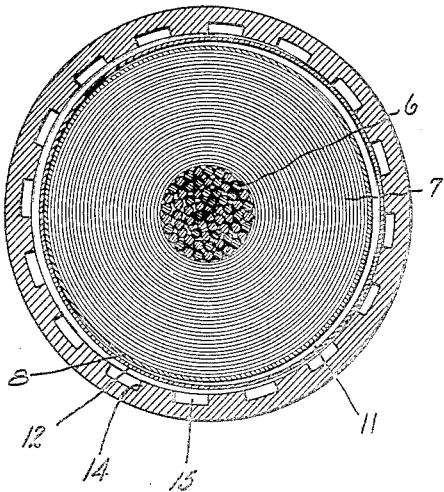
Figure 5:
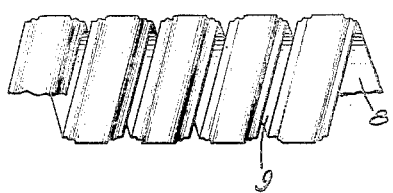

In the accompanying drawing which is illustrative of my invention, Fig. 1 is a cross-section of an oil-filled cable taken on line 1—1 of Fig. 2; Fig. 2 is a view partly in plan and partly in section of a short length of the same; Fig. 3 is an enlarged section of the cellular element; Fig. 4 is a cross-section of a modified form of sheath, and Fig. 5 is a detail view of the cellular element.

5 indicates a hollow support such as a coiled spring upon which the individual wires 6 are laid to form the conductor, and which is filled at all times with fluid such as oil, for example. Surrounding the conductor is a wrapping of insulation 7 of which paper is a good example. Oil from the center of the cable impregnates the paper. Only one conductor is shown but a greater number may be employed when desired. Surrounding the insulation is a metal tape or strip 8 which is spirally wrapped thereon. The turns or wraps of the tape are spaced apart as indicated at 9 to afford spaces for the oil. The tape also serves as a mechanical means to bind the insulation in place and is particularly useful where several conductors are mounted in the same sheath to prevent them from spreading. It may also serve in part in some cases as a means for distributing electrical stresses.

Surrounding the cable is a sheath 10 which may be made of lead or equivalent material and which is impervious to oil.

Between the body of the insulation and the inner wall of the sheath a cellular element is located which extends for the entire length of the cable section or at least over the greater portion of its length and which is so constructed and arranged as to contract under increases of pressure of the oil within the cable, due to increase of temperature and thus affords additional space for the oil without its stretching the sheath, and which expands as the oil cools and thus assists in forcing the oil back into the insulation and prevents formation of voids. To carry out this feature of the invention in a simple manner the metal binding strip or tape 8 is used as one wall of an expansion chamber 11, the remainder of the structure being defined by a thin strip or ribbon of metal 12 which is soldered or otherwise secured along its edges to the tape. It is also suitably corrugated as for example as indicated at 13 to increase the flexibility of the outer and movable wall. A portion but not all of the outer wall is out of contact with the inner surface of the cable sheath so as to afford a suitable area upon which the oil acts, as best shown in Fig. 2. As will readily be seen the expansion or cellular element is in the form of a spiral wrapping around the cable insulation and inside the sheath and while the space between the walls is relatively small the chamber thus formed is very long and hence the element is amply able to take care of the expansion and contraction of the oil. The ends of the chamber are sealed to prevent the admission of oil thereto. Each section of the cable should be provided with at least one of these elements. One element may be used for an entire cable section or several such elements may be used, each acting independently of the other. As a general proposition, the more nearly uniform the arrangement of the cellular element over the entire cable the better and more uniform will be the results obtained.

In the type of cable thus far referred to a body of oil is contained within a channel defined by the central support 5 of the conductor and penetrates the insulation from the center outwardly. My improved arrangement may also be utilized in connection with a cable wherein the oil is contained in channels located between the sheath and the insulation and penetrates the insulation from the outside toward the center. Such an arrangement is shown in Fig. 4, where the sheath is provided with internal ribs 14 which engage the outer wall 12 of the cellular element and between which are longitudinal oil channels 15.

The strips 8 and 12 of the element being made of relatively thin metal may be wound in place on the cable by a taping winding machine of ordinary construction during the manufacture thereof and hence the cost of applying the same will be no greater than that of a plain tape or strip.

In operation, all of the spaces between the internal parts of the cable and its sheath are completely filled with insulating fluid, in this case thin oil, and if the cable is divided into sections as it usually is, the conductors are electrically united in series and the fluid insulation in one section is prevented from flowing or migrating to adjacent sections by suitable stop joints. It is important to keep each section completely filled with the fluid to prevent voids, and by providing a cellular element within the sheath which extends lengthwise of the cable section I am able to accomplish the desired result. The construction furthermore has the advantage that the oil on expanding practically has no distance to travel before encountering a yielding wall and in any event the flow or movement is radial whereas in installations of the prior types the reservoirs may be separated by several hundred feet resulting in a considerable longitudinal movement of the fluid.

What I claim as new and desire to secure by Letters Patent of the United States is:

1. A high tension cable comprising a conductor, insulation therefor which includes a fluid and an impervious sheath, in combination with a spirally wound cellular element located within the sheath and extending longitudinally thereof and comprising two spaced metal strips united along their edges to form a closed chamber, one of said strips being corrugated in the direction of its length to increase its flexibility.

2. A high tension cable comprising a conductor, insulation wrapped thereon and an impervious sheath, in combination with a cellular element within the sheath comprising a thin metal tape which is tightly and spirally wound around the insulation to bind it in place, a second metal tape which is spirally wound around the first tape, is spaced therefrom in the region of its center to form an expansion chamber and has its edges united fluid tight to those of the first tape, the central portion of the second tape being held by the inner wall of the sheath.

3. A high tension cable comprising a conductor, insulation therefor which includes a fluid, and an impervious sheath, in combination with a cellular element located between the sheath and the insulation and extending longitudinally thereof and comprising two spaced metal walls united along their edges to form a closed chamber, one of said walls being in contact with the insulation and the other with the inner wall of the sheath, said element being corrugated to increase its flexibility.

4. A high tension cable comprising a conductor, pervious insulation thereon, an impervious sheath having longitudinal channels in its inner wall, which surrounds the insulation, an expansible element comprising spaced metal walls spirally wound around the insulation with spaces between the turns and containing an elongated closed chamber, the inner wall of the element resting on the insulation and the outer wall engaging those portions of the sheath between the channels, and a body of insulation which fills the channels and flows therefrom through the spaces between the turns of said element into the pervious insulation.

In witness whereof, I have hereunto set my hand this 25th day of July, 1928.

FRANCIS V. CALVERT.